Oct. 24, 1950     E. WEISHAAR     2,526,984
POSTHOLE DIGGER
Filed July 8, 1946     2 Sheets-Sheet 1
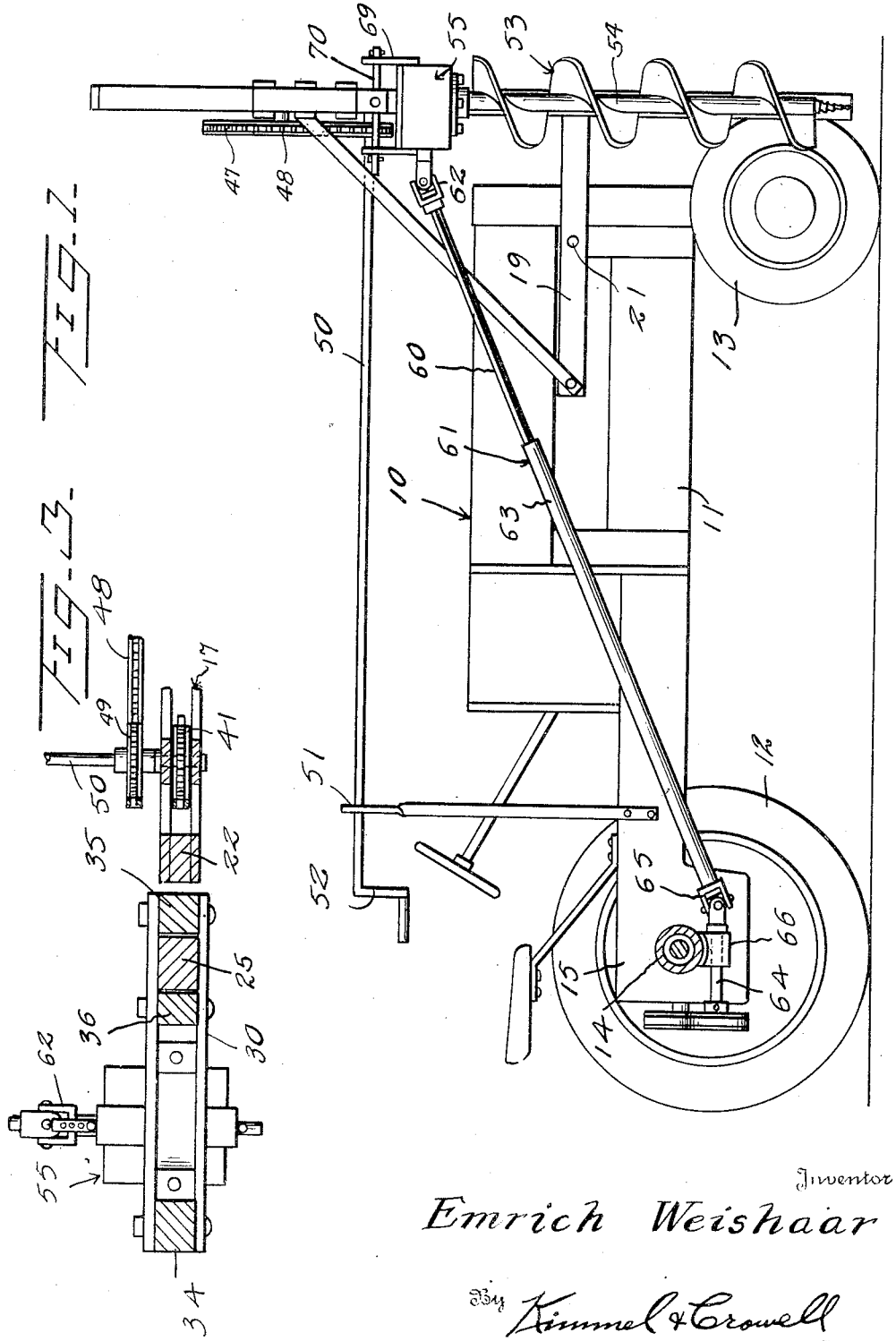
Inventor
Emrich Weishaar
By Kimmel & Crowell
Attorneys Oct. 24, 1950     E. WEISHAAR     2,526,984
POSTHOLE DIGGER
Filed July 8, 1946     2 Sheets-Sheet 2
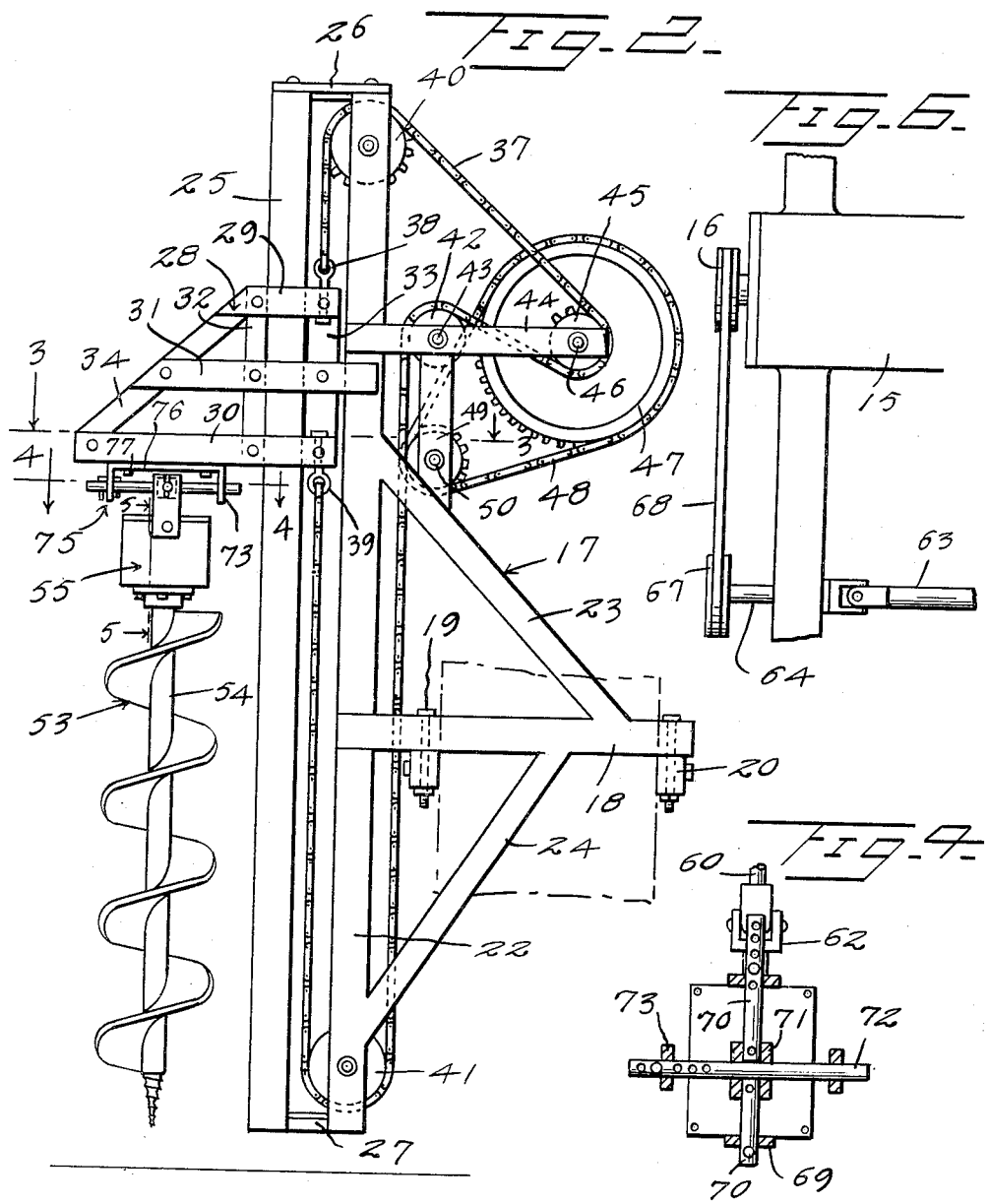
Inventor
Emrich Weishaar
By Kimmel & Crowell
Attorneys Patented Oct. 24, 1950

2,526,984

UNITED STATES PATENT OFFICE 2,526,984

POSTHOLE DIGGER

Emrich Weishaar, Ashton, Ill.

Application July 8, 1946, Serial No. 682,044

2 Claims. (Cl. 255—21)

This invention relates to post hole diggers.

An object of this invention is to provide as a new article of manufacture, a post hole digger which can be readily mounted on the front end of a tractor as an attachment on a tractor for operation by the power take-off of the tractor.

Another object of this invention is to provide a post hole digger embodying a vertical drill or auger guide, means for supporting the guide on the tractor, and means for moving the auger along the guide.

A further object of this invention is to provide a post hole digger which is of simple construction so that it can be made at moderate cost and in operation the device can be controlled from the seat of the tractor.

With the above and other objects in view, my invention consists in the arrangement, combination and details of construction disclosed in the drawings and specification, and then more particularly pointed out in the appended claims.

In the drawings,

Wherein similar reference characters designate similar parts throughout the respect view, Figure 1 is a detail side elevation of a post hole digger constructed according to an embodiment of this invention, Figure 2 is a detail front elevation of the device, Figure 3 is a fragmentary sectional view taken on the line 3—3 of Figure 2, Figure 4 is a sectional view taken on the line 4—4 of Figure 2, Figure 5 is a fragmentary sectional view taken on the line 5—5 of Figure 2, Figure 6 is a fragmentary plan view of the connection between the digger and the power take-off of a tractor.

Referring to the drawings, the numeral 10 designates generally a tractor of conventional construction which is formed of a frame 11 having rear driving wheels 12 and front steering wheels 13. The tractor 11 includes a rear axle housing 14 and a power take-off 15 on which a driving pulley 16 is mounted.

The frame 11 of the tractor has mounted thereon an auger supporting frame generally designated as 17. The frame 17 includes a front horizontal bar 18 which is fixed as by fastening members 19 to horizontally disposed side bars 20 fixed by fastening members 21 to the sides of the frame 11. A vertically disposed frame bar 22 is secured to the outer end of the horizontal bar 18 and is braced by means of angled bracing members 23, 24. In this manner the vertical bar 22 is adapted to be offset laterally from the side of the tractor frame 11. The bar 22 has disposed in outwardly offset parallel relation a guide bar 25 which is fixed at the upper and lower ends thereof to the vertical bar 22 by means of an upper plate 26 and a lower connecting plate 27.

A slide structure, generally designated as 28 slidably engages the guide bar 25 and includes upper and lower horizontal bars 29, 30 and an intermediate horizontal bar 31, and a pair of vertical connecting bars 32, 33, which are connected between the horizontal bars 29, 30, 31. The angled bracing member 34 is connected to the outer ends of the horizontal bars 29, 30, 31.

As shown in Figure 3, there are two slide frame members, which are held in spaced apart relation by spacing members 35, 36. The slide 28 is adapted to be vertically adjusted by means of a flexible slide adjusting and supporting member 37 in the form of an elongated chain. The chain 37 is connected as at 38 at one end thereof to the upper end of the slide 28 and is connected as at 39 to the lower end of the slide 28.

The bar 22 has rotatably mounted adjacent the upper end thereof an upper sprocket 40 over which the chain 37 is trained, and the bar 22 also has a lower sprocket 41 rotatably mounted thereon and about which the chain 37 is trained. An idler sprocket 42 is rotatably mounted on a pivot member 43 carried by a horizontally and inwardly extending bar 44 which is fixed at its outer end to the vertical bar 22. The inner sprocket 45 is rotatably carried by pivot member 46 which is carried by the inner end of the bar 44 and the chain 37 is also trained about the sprocket 45.

The pivot member 46 is in the form of a sprocket shaft on which is mounted a large sprocket 47. The endless chain or flexible member 48 is trained about the large sprocket 47 and also about the small adjustable sprocket 49 carried by the elongated shaft 50. The shaft 50 is extended rearwardly as shown in Figure 1, being journaled to an upright supporting bar 51 which is fixed to the rear portion of the frame 11 and the shaft 50 has fixed on the rear end thereof a crank 52.

An auger generally designated as 53 is disposed in parallel relation with the guide 25 and includes a shaft 54 which at its upper end extends into a gear housing 55. A beveled gear 56 is fixed on the upper end of the auger shaft 54, within the housing 55, and a beveled gear 57 carried by stub shaft 58 meshes with the gear 56. The stub shaft 58 is journaled in bearings 59 carried by the housing 55, and the stub shaft 58 is connected to one portion 60 of an extensible shaft 61 through a Universal joint 62.

The shaft 61 includes a rear shaft member 63 telescoping over the outer or upper shaft member 60, and the rear lower end of the shaft member 63 is coupled to the rear stub shaft 64 through a Universal joint 65. The rear stub shaft 64 is journaled in bearing 66 which is fixed to axle housing 14, and the rear end of the stub shaft 64 has mounted thereon a pulley 67. A belt 68 is trained about the driving pulley 16, and the driven pulley 67, and provides the power means for rotating the auger 53.

The housing 55 is swingably supported from the lower horizontal bars 30 of the slide 28 in the following manner: A pair of upwardly extending ears 69 are fixed to the housing 55 and a shaft 70 extends through the ears 69. In practice the shaft 70 is formed in two parts as shown in Figure 4, which are fixed within a block 71. The block 71 has extending therethrough at right angles to the aligned shaft members 70, a shaft 72. The shaft 72 extends through the depending legs 73 of a U-shaped supporting bracket or member 75. The U-shaped member 75 has the bight 76 thereof fixed by fastening members 77 to the lower edges of the slide bars 30. In this manner the auger may rotate during the post hole digging or drilling operation at an angle to the vertical bar 22 and slide 28 without causing damage to the driving mechanism or to the supporting mechanism.

In the use and operation of this post hole digger, the auger 53 is elevated by operation of the crank 52 which will raise the slide 28 to dispose the lower end of the auger above the ground. The auger is suspended over the desired position whereupon the power take-off 15 is operated in order to rotate the extensible and retractable shaft 61. When the auger 53 is rotated it may be lowered to contact the ground by rotating the crank 52 and this crank may be progressively rotated so as to feed the auger into the ground during the drilling operation.

I do not mean to confine myself to the exact details of construction herein disclosed, but claim all variations falling within the purview of the appended claims.

What I claim is:

1. A post hole digging attachment for a tractor having a power take-off comprising a vertical frame including an outer elongated vertical guide member and a pair of parallel spaced apart elongated inner guide members, means connecting said outer guide member to said pair of inner guide members at the top and bottom thereof, means fixedly mounting said pair of inner guide members on the front end of a tractor, an auger carrier including an inner vertical member disposed between said outer and inner guide members, an outer vertical member disposed outwardly of said outer guide member and slidable thereagainst, and a plurality of pairs of horizontal spaced apart members disposed on opposite sides of said outer guide member and connecting said inner and outer vertical members of said carrier together, the inner ends of one pair of said horizontal members overlying said inner guide members, an inverted U-shaped support bracket carried by the lowermost of said pair of horizontal members, a pair of right angularly related shafts fixed to each other, the opposite ends of one of said shafts being rockably mounted in the side legs of said bracket, a gear box having upstanding ears on the top thereof, said ears rockably engaging the opposite ends of the other of said pair of shafts, an auger journalled in said gear box and depending therefrom, a telescoping drive shaft extending from said gear box to said power take-off, gear means in said gear box for connecting said auger to said drive shaft for rotation therewith, and means on said frame for raising and lowering said auger carrier.

2. A post hole digging attachment as set forth in claim 1, wherein said last named means includes an upper and lower sprocket wheel rotatably mounted between said pair of inner guide members at the top and bottom ends thereof respectively, a sprocket chain trained over said upper and lower sprocket wheels and having the ends thereof secured to the opposite ends of said inner vertical member of said carrier, a drive sprocket wheel rotatably carried on said frame and engaging said chain, and manual means connected to said drive sprocket for rotating the latter.

EMRICH WEISHAAR.

REFERENCES CITED

The following references are of record in the file of this patent:

UNITED STATES PATENTS

| Number | Name | Date |
|---|---|---|
| 1,360,193 | Davidson | Nov. 23, 1920 |
| 2,251,506 | Tichy | Aug. 5, 1941 |
| 2,321,680 | Houston | June 15, 1943 |
| 2,384,557 | Piper | Sept. 11, 1945 |
| 2,400,478 | Beck | May 21, 1946 |
| 2,411,627 | Jaques | Nov. 26, 1946 |